(No Model.)

G. A. BARTH.
TRUNNION FOR CYLINDERS.

No. 398,571. Patented Feb. 26, 1889.

WITNESSES.

INVENTOR.
Gustav A. Barth by
Paul Bakewell,
his attorney.

UNITED STATES PATENT OFFICE.

GUSTAV A. BARTH, OF ST. LOUIS, MISSOURI, ASSIGNOR TO PIERRE CHOUTEAU, OF SAME PLACE.

TRUNNION FOR CYLINDERS.

SPECIFICATION forming part of Letters Patent No. 398,571, dated February 26, 1889.

Application filed October 22, 1888. Serial No. 288,835. (No model.)

*To all whom it may concern:*

Be it known that I, GUSTAV A. BARTH, a citizen of the United States, residing at the city of St. Louis, State of Missouri, have invented a certain new and useful Improvement in Pivots or Trunnions for Steam-Cylinders and other Apparatus having a Pivotal Movement, of which the following is a full, clear, and exact description.

My invention relates to an improved pivot or trunnion applicable to steam-cylinders, guns, and other apparatus subjected to oscillatory or rotary movement, and has for its object to provide a pivot or trunnion which can be readily fixed to or detached from the object to be fitted therewith.

It consists in a screw-bolt the head of which is inserted and confined within a slot formed in the side of the cylinder or other object. Around the externally-projecting portion of the bolt is a bush or sleeve having preferably a collar at each end, the whole being tightened together and to the cylinder or other object by a nut on the outer screwed end of the bolt bearing against one of the said collars.

Figure 1:
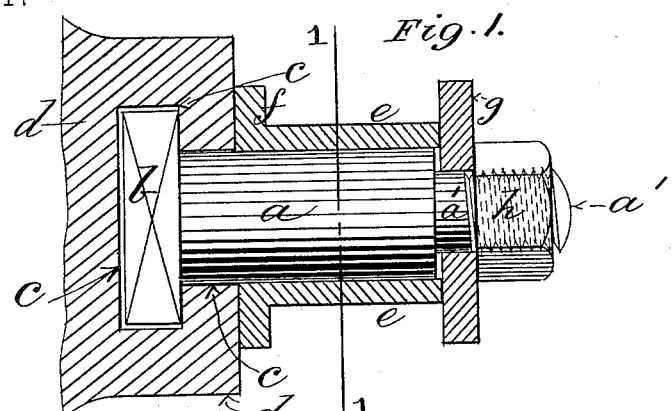
Figure 2:
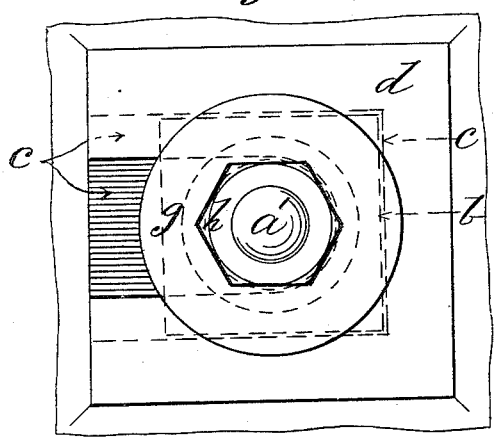
Figure 3:
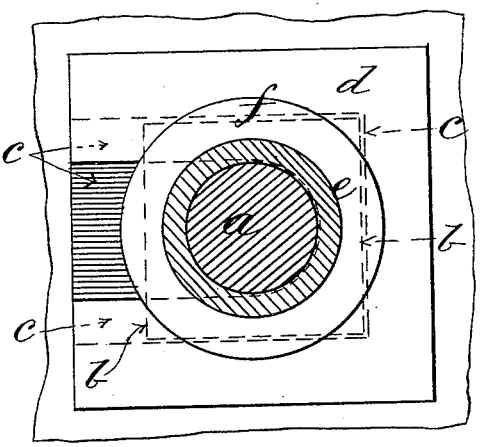

On the accompanying drawings, Figure 1 represents a side elevation of my improved pivot or trunnion; Fig. 2, an end view thereof; Fig. 3, a transverse section on line 1 1 in Fig. 1; and Fig. 4, an end view, to a reduced scale, of the trunnion applied to the side of a steam-cylinder, like letters of reference denoting like parts in all the figures.

$a$ represents a bolt having a square (or other suitably shaped) head, $b$, which, with a portion of the bolt $a$ adjacent thereto, is inserted sidewise within the open end of and along a T-shaped slot, $c$, formed in the casting or material $d$ of the object to which the pivot or trunnion is to be applied, the slot $c$ being so arranged that the external portion of the bolt $a$ will project therefrom at right angles to the plane of rotation or oscillation of the casting $d$.

Around the projecting plain portion of the bolt $a$ is fitted a bush or sleeve, $e$, which is formed at its inner end preferably with a collar, $f$, bearing against the outside of the casting $d$. On the reduced screwed end portion, $a'$, of the bolt $a$ is placed a washer, $g$, which bears against and forms a collar to the outer end of the sleeve $e$, which, with its collars $f$ and $g$, constitutes the journal of the pivot or trunnion.

On the screwed end $a'$ of the bolt $a$ is placed a nut, $h$, which, on being screwed up hard against the outside of the washer $g$, tightens the latter with the sleeve $e$ against the casting $d$, and at the same time draws the bolt $a$, so as to clamp the shoulder or under side of its head $b$ tight against the inside of the slot $c$, whereby the entire pivot or trunnion is securely fixed endwise to the casting $d$; or, if desired, in lieu of the reduced screwed end portion, $a'$, of the bolt $a$, the latter with its screwed end may be made of equal diameter throughout.

Figure 4:
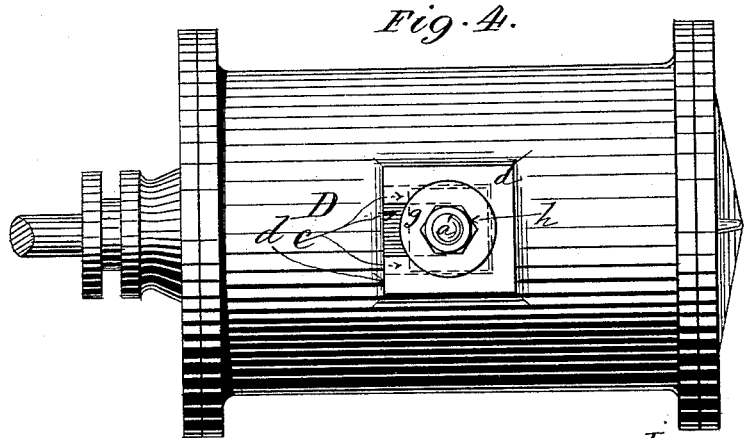

Fig. 4 illustrates the application of my invention to a horizontally-oscillating steam-cylinder, D, having at opposite parts of its circumference projections $d$, in which are formed the slots $c$ for receiving the pivots or trunnions, the direction of the slots $c$ being preferably at right angles to the vertical line of gravity of the cylinder D.

I claim as my invention—

1. The combination, with a cylinder having slotted projections, of detachable sleeve-trunnions, and T-headed bolts and nuts for securing the sleeve-trunnions to said cylinder, substantially as and for the purposes described.

2. The combination, with a cylinder having slotted projections, of detachable sleeve-trunnions provided with collars, and T-headed bolts and nuts for securing the sleeve-trunnions to said cylinder, substantially as and for the purposes described.

3. The combination, with a cylinder having slotted projections, of detachable sleeve-trunnions provided with collars and washers, and T-headed bolts and nuts for securing the sleeve-trunnions to said cylinder, substantially as and for the purposes described.

In testimony whereof I affix my signature, in presence of two witnesses, this 18th day of October, 1888.

GUSTAV A. BARTH.

Witnesses:
SARA L. SCHRADER,
PAUL BAKEWELL.